3,325,571
PROCESS FOR THE MANUFACTURE OF
SMOKELESS POWDER
John J. Sapiego, New Brunswick, N.J., assignor to Hercules Incorporated, Wilmington, Del., a corporation of Delaware
No Drawing. Filed Jan. 25, 1966, Ser. No. 522,824
5 Claims. (Cl. 264—3)

This invention relates to the manufacture of smokeless powder granules and more particularly to an improved process for the manufacture of small, densified particles of nitrocellulose suitable for use in smokeless powder and other nitrocellulose applications.

The time-honored conventional process for preparing smokeless powder granules has consistently over the years been a reliable process for producing a product of uniform physical properties and ballistic performance. However, the process is tedious and lengthy and requires considerable massive and expensive equipment. More specifically, the process involves dehydrating water-wet nitrocellulose with denatured alcohol in a conventional blocking press, and the blocks of dehydrated nitrocellulose are then broken up in a block breaker. The resulting dehydrated nitrocellulose is then masticated in large Baker-Perkin dough mixers with nitroglycerin, denatured ethyl alcohol and acetone to form a homogeneous stiff dough which is then blocked into cylinders in large hydraulic presses, which blocked cylinders are then extruded through dies into strands in hydraulic presses at high pressures, and the strands are cut into the desired particle or grain size in cutters. The resulting powder grains must then be dried for several days in warm, dry houses, after which the dried grains are coated and glazed in Sweetie barrels, screened, and blended.

Smokeles spowder granules have also been prepared by a procedure known in the art as the "Ball Powder" process. Very briefly, this process involves dispersing a solution of nitrocellulose in a substantially water-immiscible volatile nitrocellulose solvent in water in the presence of a watersoluble protective colloid such as starch or gum arabic with agitation to form an emulsion or suspension of lacquer globules in water, and the solvent is then stripped from the lacquer globules by distillation under controlled distillation conditions, and usually in the presence of an electrolyte such as sodium sulfate dissolved in the water phase of the emulsion or suspension. In this process the protective colloid coats each lacquer globule to prevent the globules from coalescing into large globules, and the solvent must be gradually removed at a carefully controlled rate to promote the formation of dense spherical and spheroidal particles of nitrocellulose. The electrolyte in the water phase of the emulsion also promotes improved densification of the particles as the solvent is removed.

An object of this invention, therefore, is to provide a simplified and improved process for manufacture of smokeless powder granules, which has procedural and economic advantages over prior art processes.

Another object of this invention is to provide an improved process for manufacture of small ellipsoidal and spheroidal particles of densified nitrocellulose suitable for use as smokeless powder granules and in other applications where small particles of densified nitrocellulose are necessary or desirable.

It is a further object of this invention to provide an improved process for manufacture of small ellipsoidal and spheroidal particles of densified nitrocellulose substantially within a size range from about 100 microns to about 500 microns.

Another object of this invention is to provide an improved process for manufacture of small ellipsoidal and spheroidal particles of densified nitrocellulose directly from water-wet fibrous nitrocellulose and wetted with either water or hydrocarbon diluent, as desired.

I have now discovered that these objects and others are accomplished in accordance with the present invention which, generally described, comprises dispersing watermoist nitrocellulose fibers in a volatile organic liquid mixture of nitrocellulose solvent and hydrocarbon diluent with mild shearing agitation to form a slurry of said nitrocellulose fibers substantially free of fiber aggregates, said organic liquid mixture being only a softening and swelling agent for nitrocellulose incapable of dissolving said nitrocellulose fibers, continuing the mild shearing agitation until substantially all of the nitrocellulose fibers are uniformly softened, swollen, and comminuted into fragments substantially within the size range from about 100 microns to about 500 microns, diluting the slurry while continuing the mild shearing agitation with sufficient liquid nonsolvent for nitrocellulose to form a layer of tough, densified nitrocellulose substantially free of stickiness enveloping each softened and swollen nitrocellulose fiber fragment to inhibit agglomeration of said fragments and continuing said agitation until the fiber fragments have substantially all become shaped into smooth-surfaced, rounded particles of substantially ellipsoidal and spheroidal shapes, said liquid nonsolvent for nitrocellulose being selected from the group consisting of water and hydrocarbon diluent which is the same as the hydrocarbon diluent component of said volatile organic liquid mixture, and thereafter diluting the slurry with a large excess of said liquid nonsolvent for nitrocellulose and subjecting the thus diluted slurry to distillation with agitation to remove substantially all nitrocellulose solvent and hydrocarbon diluent when said liquid nonsolvent for nitrocellulose is water, and to remove substantially all nitrocellulose solvent and water when said liquid nonsolvent for nitrocellulose is hydrocarbon diluent to complete the hardening and densification of the particles.

The above process produces a slurry of small, hard, rounded and smooth-surfaced particles of substantially ellipsoidal and spheroidal shapes in either water or a hydrocarbon diluent, depending on whether the distillation step of the process is carried out in the presence of a large excess of water, or in the presence of a large excess of hydrocarbon diluent. In either case, the densified nitrocellulose particles are recovered wetted with sorbed slurry medium, with sorbed water when the slurry medium at the termination of the distillation step is water, and with sorbed hydrocarbon diluent when the slurry medium at the termination of the distillation step is hydrocarbon diluent, by any convenient means, such as by gravity drainage, centrifugation, suction filtration, or the like. These densified particles have a diversity of particle sizes substantially in the range from about 100 microns to about 500 microns, with an overall spread between about 80 microns and 600 microns, and with a substantial majority of the particles having sizes in the range from about 100 microns to about 300 microns. The absolute density of these particles is at least about 1.2 gms./cc., and normally is in the range from about 1.226 gms./cc. to about 1.514 gms./cc., the absolute density of completely densified nitrocellulose being approximately 1.65 gms./cc. The bulk density of these particles is at least about 30 lbs./cu. ft., and normally is in the range from about 30 lbs./cu. ft. to about 34 lbs./cc. ft. When magnified, these particles are seen to have smooth, dense, glazed surfaces and, generally, to have a somewhat porous interior structure capable of absorbing liquids such as nitroglycerin or mixtures of nitroglycerin and nonexplosive desensitizing nitrocellulose plasticizers.

In practicing this invention, water-wet fibrous nitrocellulose, after conventional treatments for stabilization and viscosity adjustment, is slurried with water and beaten in a Jordan engine or similar fiber-beating device to break up fiber aggregates and shorten the fibers and produce an aqueous slurry of nitrocellulose fibers substantially free of fiber aggregates. Excess water is then drained off, preferably by centrifugation or suction filtration to produce nitrocellulose fibers moist with sorbed water. The terms "sorb" and "sorbed" are used herein in the usual sense to mean the ability of the nitrocellulose to take up and hold a liquid, either by adsorption or absorption, or by a combination of adsorption and absorption, substantially independent of gravitational forces.

The resulting water-moist nitrocellulose fibers are then introduced and dispersed at substantially room temperature with mild shearing agitation, such as is produced by a Cowles Dissolver (Morehouse-Cowles, Inc., 1150 San Fernando Road, Los Angeles, Calif.), or the like, rotating at a rotational speed in the range from at least about 1,000 r.p.m. to about 4,000 r.p.m., into a volatile organic liquid mixture of hydrocarbon diluent and nitrocellulose solvent, which mixture is only a softening and swelling agent for the nitrocellulose fibers incapable of dissolving the fibers, to form a stirrable slurry of nitrocellulose fibers substantially free of fiber aggregates. The water-moist nitrocellulose fibers are introduced into the volatile organic liquid mixture as rapidly as the agitating device can disperse the fibers, either in small increments or continuously, as desired. The time required to accomplish addition and dispersal of the water-moist nitrocellulose fibers in the organic liquid mixture is usually quite short, amounting at most to only a few minutes.

Mild shearing agitation is continued on the resulting slurry until substantially all of the nitrocellulose fibers have become uniformly softened and swollen and comminuted into fiber fragments substantially within the size range from about 100 microns to about 500 microns. The progress of the softening, swelling, and comminuting action can readily be followed by observation of samples taken at intervals, aided by magnification. Softening and swelling of the nitrocellulose fibers commence as soon as the fibers have been introduced into the organic liquid mixture, and the fibers become progressively more softened and swollen until an ultimate degree of softening and swelling of the fibers, depending largely upon the proportions of nitrocellulose solvent component and hydrocarbon diluent component in the organic liquid mixture, is attained. The time required to reach this ultimate degree of softening and swelling may require anywhere from about 10 minutes to one-half hour or more. At this ultimate stage of softening and swelling of the fibers, it is postulated that a state of dynamic equilibrium exists in the slurry between comminution of the softened and swollen fibers into fragments by the mild shearing agitation and recombination by agglomeration of the comminuted softened and swollen fragments. This equilibrium can be substantially controlled by the rate of rotation of the agitating device to favor comminution at the expense of agglomeration, or agglomeration at the expense of comminution, increasing the rate of agitation favoring comminution, and decreasing the rate of agitation favoring agglomeration. It is within the purview of this invention, therefore, to make adjustments in the rate of rotation of the agitating device, if necessary, during the softening and swelling of the fibers to control the degree of agglomeration of the comminuted softened and swollen fiber fragments so that a substantial majority of the fragments are substantially within the desired size range from about 100 microns to about 500 microns.

The mild shearing agitation contemplated by this invention is provided by agitators which have rotating disc impellers having peripheral projecting and raised tooth-like vanes and which rotate at moderately high speeds, up to about 5,000 to 6,000 r.p.m. Such impellers impart moderately high velocity to the material in a zone of intense turbulence immediately surrounding the impeller. As the high velocity material is forced rapidly outward by centrifugal force, it impinges on the surrounding slower moving portions of the slurried material, thereby effecting attrition by a combination of violent impact and shearing of particle on particle. Recirculation of the slurried material back into the zone of intense turbulence is rapid. Conventional paddle or turbine agitators are incapable of providing the degree of shearing action which is important and necessary for the purposes of this inveniton. Moreover attrition mills, such as the Kady Dispersion Mill, which rotate at very high speeds in the range of 10,000 to 16,000 r.p.m. and which generate very high shearing action on the slurried fibers, produce particles, a substantial majority of which are substantially smaller than the size range contemplated by this invention.

When observation indicates that a substantial equilibrium condition exists in the agitated slurry and that a substantial majority of the comminuted fragments are in the desired size range, the slurry is then diluted, while continuing the mild shearing agitation, with sufficient liquid nonsolvent for nitrocellulose to form a case-hardened layer of tough, densified nitrocellulose substantially free of stickiness enveloping each softened and swollen nitrocellulose fiber fragment. The purpose of this dilution is to arrest and inhibit agglomeration of the comminuted softened and swollen fiber fragments. The nonsolvent selected for this purpose is water when densified nitrocellulose particles wet with water are desired and is a hydrocarbon diluent which is the same as the hydrocarbon diluent component of the organic liquid mixture of this invention when densified nitrocellulose particles wet with hydrocarbon diluent are desired. The amount of nitrocellulose nonsolvent to effect the desired case-hardening of the fiber fragments may vary from about 7% to about 14% by weight, based on the combined weight of the nitrocellulose solvent and hydrocarbon diluent components of the volatile organic liquid mixture of this invention, and preferably is added in two approximately equal portions with an interval of mild shearing agitation between the two additions to obtain optimum uniformity of particle size and shape. The interior of the case-hardened fiber fragments after the first addition of nitrocellulose nonsolvent is still soft and swollen, and the fiber fragments are quite susceptible to shaping into smooth-surfaced, rounded particles of substantially ellipsoidal and spheroidal shapes by continued mild shearing agitation. A possible explanation of this is that the case-hardened fiber fragments with a soft and swollen interior structure are resilient and rubbery with surfaces substantially free of stickiness. Accordingly, mild shearing agitation is continued on the diluted slurry for a period of 20 to 30 minutes or more until observation indicates that substantially all of the case-hardened fiber fragments have become rounded and smoothed into substantially ellipsoidal and spheroidal shapes.

The slurry is then diluted with the second portion of the same nitrocellulose nonsolvent, and mild shearing agitation is continued for an additional 30 to 45 minutes. During this period of mild shearing agitation, further refinement of the shape of the particles takes place, and the particles progressively shrink and become harder and more densified as the liquid organic mixture in the interior of the particles diffuses and becomes diluted with the nitrocellulose nonsolvent.

The slurry is then diluted with a large excess of the same nonsolvent for nitrocellulose employed for the case-hardening and shaping of the particles, and the diluted slurry is subjected to distillation to complete the hardening and densification of the particles, adding additional nitrocellulose nonsolvent as needed to maintain the liquid level in the distillation vessel. When hydrocarbon diluent is employed as the nitrocellulose nonsolvent to dilute the slurry, the distillation is continued until substantially all nitrocellulose solvent and water are removed to produce a slurry of the hardened and densified nitrocellulose particles in hydrocarbon diluent. When water is employed as the nitrocellulose nonsolvent to dilute the slurry, the distillation is continued until substantially all nitrocellulose solvent and hydrocarbon diluent are removed to produce a slurry of hardened and densified nitrocellulose particles in water. The slurry desirably should be agitated during the distillation step, and any conventional propeller, paddle, or turbine agitator will suffice, for the case-hardened particles have a negligible tendency to stick together. As noted hereinabove, the hardened and densified particles of nitrocellulose are readily recovered wetted with either sorbed water or sorbed hydrocarbon diluent, depending on whether water or hydrocarbon diluent is the slurrying medium at the termination of the distillation step, by draining off excess slurrying medium by any convenient method, such as by gravity drainage, suction filtration, centrifugation, or the like.

It has been found that particle uniformity with respect to both size and spheroidal shape is improved by inserting flat plate-like baffles, one, two, or more, into the slurry above the rotating impeller at a downwardly sloping inclined angle during the case-hardening and shaping of the comminuted swollen and softened fiber fragments. Moreover, this invention has been practiced with and without the use of a water-soluble protective colloid, such as water-soluble methyl cellulose or gum arabic, in the densifying medium, and densified nitrocellulose particles with substantially the same particle characteristics as to size, shape, density, etc., are obtained either with or without the use of the protective colloid.

Various additives such as nitrocellulose stabilizers, carbon black, desensitizing plasticizers, and other desirable additives which are soluble or dispersible in the densifying medium of this invention can be introduced into the slurry at any convenient point in the process and become very uniformly distributed into the nitrocellulose product. For example, triacetin which is a desensitizing plasticizer for smokeless powder granules is very uniformly distributed in the densified nitrocellulose particles when added to the slurry dissolved in water employed as the nitrocellulose nonsolvent for diluting the densifying medium of this invention.

In addition to use in the manufacture of smokeless powder, the densified nitrocellulose particles of this invention can be used in any application where commercial nitrocellulose is now used, such as lacquers, plastics, paints, adhesives, coatings, inks, impregnations, and the like. The chemical characteristics of the product of this invention are substantially the same as commercial nitrocellulose, since no chemical action is involved in the process of producing this product.

The general nature of the invention has been set forth, and the following examples are presented as specific illustrations thereof. All parts and percentages are by weight unless otherwise stated.

*Example 1*

Water-wet, fibrous smokeless-type nitrocellulose, 13.4% nitrogen by weight, 17 seconds 5/16-inch falling ball viscosity measured in accordance with Military Spec. JAN-N-244, after conventional treatments for stabilization and viscosity adjustment, was slurried with water to the consistency of a conventional pulping slurry and jordaned to break up fiber aggregates and shorten the fibers and produce a slurry of nitrocellulose fibers substantially free of fiber aggregates. This slurry was then de-watered on a suction filter to 70.1% nitrocellulose by weight.

Five-hundred-eight and two-tenths (508.2) parts of this water-moist nitrocellulose containing 354.2 parts nitrocellulose, dry weight, and 154 parts water were then introduced and dispersed at room temperature with mild shearing agitation in an organic liquid mixture of 864.6 parts acetone and 827.2 parts heptane in a covered stainless steel vessel equipped with a Cowles dissolver operating at 3,000 r.p.m. to form a stirrable slurry of nitrocellulose fibers substantially free of fiber aggregates. This required approximately five minutes. The ratio of acetone to nitrocellulose was 2.44, and the ratio of acetone to heptane was 1.04 by weight.

The slurry was then subjected to ten minutes of mild shearing agitation with the Cowles agitator rotating at 3,000 r.p.m. with the vessel covered, whereupon the cover was removed from the vessel, and mild shearing agitation at the same rotational rate was continued for another 15 minutes, whereupon observation of a sample withdrawn from the slurry, with the aid of magnification, indicated substantially all fibers to be uniformly softened, swollen, and comminuted into fragments substantially within the size range from about 100 microns to about 500 microns.

The slurry was then diluted with 68.5 parts of heptane to case-harden the softened and swollen fiber fragments, and mild shearing agitation at the same rotational rate was continued for an additional 30 minutes, during which substantially all of the softened and swollen fiber fragments became smoothed and rounded into ellipsoidal and spheroidal shapes. An additional 68.5 parts of heptane were then added to the slurry, and mild shearing agitation was continued for an additional 40 minutes. During this latter period of mild shearing agitation, further refinement of shape and surface of the particles took place, and the particles became harder and more densified.

The slurry was then diluted with approximately 350 additional parts of heptane and transferred to a distillation kettle provided with a conventionl propeller-type agitator, and substantially all of the acetone and water were removed by distillation, adding heptane as needed to maintain the liquid level in the distillation vessel. Distillation was discontinued when the distillation temperature reached, and remained substantially steady at, the boiling point of heptane. The slurry of small, densified nitrocellulose particles in heptane was then deliquefied on a suction filter to 70% total solids by weight. The resulting densified nitrocellulose particles had an absolute density, dry weight of 1.426 gms./cc. and a bulk density, dry basis, of 33.2 lbs./cu. ft. The overall particle size was in the range from 80 microns to 600 microns, with a majority of the particles in the range from 100 microns to 300 microns. Visual examination with the aid of magnification showed the particles to be smooth and rounded with dense, glazed surfaces and for the most part to be of ellipsoidal and spheroidal shapes.

These densified nitrocellulose particles were dried, coated, glazed, and successfully fired in 22-caliber rifle and pistol shells, following conventional smokeless powder techniques. The ballistic characteristics were satisfactory.

The 5/16-inch falling ball viscosity characteristic of the nitrocellulose was measured in accordance with Military Spec. JAN-N-244 on a 10% by weight solution of the nitrocellulose in a solvent composed of 11.1% denatured ethyl alcohol and 88.9% acetone by weight at 25° C., noting the time in seconds for a 5/16-inch steel ball to fall freely 10 inches through the solution.

*Example 2*

Example 1 was duplicated except that water instead of heptane was employed to dilute the slurry for the case-hardening, shaping, and distillation steps of the process. In this example 100 parts of water were employed in each of the first two dilutions of the slurry in place of the 68.5 parts of heptane employed in the first two dilutions of the slurry in Example 1. The third dilution of the slurry just before the distillation step was with 350 parts of water.

The resulting densified nitrocellulose product, therefore, after deliquefying the slurry following the distillation step, was wetted with approximatetly 30% by weight of water, instead of heptane as in Example 1.

The resulting densified nitrocellulose particles had an absolute density, dry basis, of 1.302 gms./cc. and a bulk density, dry basis, of 30.5 lbs./cu. ft. The overall particle size was in the range from 80 to 600 microns with a majority of the particles in the range from 100 to 300 microns. Visual examination with the aid of magnification showed the particles to be smooth and rounded with dense, glazed surfaces, and for the most part to be of ellipsoidal and spheroidal shapes.

*Examples 3–4, inclusive*

Example 2 was duplicated except that 0.1% by weight of water-soluble methyl cellulose, based on total slurry weight, was employed in Example 3; and 0.2% by weight of water-soluble methyl cellulose, based on total slurry weight, was employed in Example 4.

The physical properties of the densified particles obtained in these two examples follow:

| | Overall Particle Size Range, microns | Majority Particle Size Range, microns | Absolute Density Dry, gms./cc. | Bulk Density Dry, lbs./cu. ft. |
|---|---|---|---|---|
| Example 3 | 80–600 | 100–300 | 1.226 | 31.4 |
| Example 4 | 80–600 | 100–300 | 1.292 | 32.6 |

Visual examination with the aid of magnification showed the densified nitrocellulose particles of each of Examples 3 and 4 to be smooth and rounded with dense, glazed surfaces and for the most part to be of ellipsoidal and spheroidal shapes.

*Examples 5–6, inclusive*

Example 1 was duplicated except that in Example 5 the rate of rotation of the Cowles agitator was 1,000 r.p.m., and in Example 6 the rate of rotation of the Cowles agitator was 3,500 r.p.m., instead of 3,000 r.p.m. as employed in Example 1.

The densified particles of Example 5 were considerably less rounded into ellipsoidal and spheroidal shapes than the particles of Example 6.

*Example 7*

Example 2 was duplicated except that triacetin was added to the slurry between the second and third dilutions of the slurry with water and the rate of rotation of the Cowles agitator was 3,500 r.p.m. instead of 3,000 r.p.m. as in Example 2.

The resulting densified nitrocellulose particles had an absolute density, dry basis, of 1.321 gms./cc. and a bulk density, dry basis, of 30.5 lbs./cu. ft. The overall particle size was in the range from 80 microns to 600 microns, with a majority of the particles in the range from 100 microns to 300 microns. Visual examination with the aid of magnification showed the particles to be smooth and rounded with dense, glazed surfaces and for the most part to be of ellipsoidal and spheroidal shapes.

*Examples 8–17, inclusive*

Example 1 was duplicated except that in Examples 8–13, inclusive, the ratio of acetone to heptane was varied while holding the ratio of acetone to nitrocellulose constant, and in Examples 14–17, inclusive, the ratio of acetone to nitrocellulose was varied while holding the total weight of slurry constant.

The following table sets forth the composition of the slurry and the physical properties of the densified particles obtained in each of Examples 8–17, inclusive. Visual examination with the aid of magnification showed the particles of each of Examples 9–17, inclusive, to be smooth and rounded with dense, glazed surfaces, and for the most part to be of ellipsoidal and spheroidal shapes. The particles of Examples 8 and 14 were considerably less rounded into ellipsoidal and spheroidal shapes than the particles of Examples 9–13 and 15–17, inclusive, due to agglomeration during the distillation step.

TABLE

| Ex. No. | Nitrocellulose, parts by weight | Water, parts by weight | Acetone, parts by weight | Heptane, parts by weight | Total slurry, parts by weight | Ratio, Acetone to Nitrocellulose |
|---|---|---|---|---|---|---|
| 8 | 353.23 | 150.52 | 861.00 | 642.24 | 2,007 | 2.44 |
| 9 | 351.90 | 153.18 | 861.00 | 703.80 | 2,070 | 2.44 |
| 10 | 353.08 | 151.02 | 863.56 | 749.34 | 2,127 | 2.44 |
| 11 | 354.20 | 154.00 | 864.60 | 827.20 | 2,200 | 2.44 |
| 12 | 353.70 | 151.25 | 863.32 | 958.72 | 2,327 | 2.44 |
| 13 | 351.94 | 151.53 | 865.17 | 1,075.36 | 2,444 | 2.44 |
| 14 | 261.80 | 112.20 | 924.00 | 902.00 | 2,200 | 3.53 |
| 15 | 308.00 | 132.00 | 891.00 | 869.00 | 2,200 | 2.90 |
| 16 | 354.20 | 154.00 | 864.60 | 827.20 | 2,200 | 2.44 |
| 17 | 407.00 | 176.00 | 836.00 | 781.00 | 2,200 | 2.05 |

| Ex. No. | Ratio, Acetone to Heptane | Cowles Agitation, 3,000 r.p.m. | Overall Particle Size Range, Microns | Majority Particle Size Range, microns | Absolute Density Dry Basis, gms./cc. | Bulk Density Dry Basis, lbs./cu. ft. |
|---|---|---|---|---|---|---|
| 8 | 1.35 | 3,000 | 80–600 | 100–300 | | |
| 9 | 1.25 | 3,000 | 80–600 | 100–300 | 1.514 | 30.8 |
| 10 | 1.15 | 3,000 | 80–600 | 100–300 | 1.415 | 32.8 |
| 11 | 1.04 | 3,000 | 80–600 | 100–300 | 1.426 | 33.2 |
| 12 | 0.90 | 3,000 | 80–600 | 100–300 | 1.448 | 31.7 |
| 13 | 0.80 | 3,000 | 75–500 | 100–200 | 1.436 | 32.5 |
| 14 | 1.02 | 3,000 | 100–600 | 200–355 | | |
| 15 | 1.03 | 3,000 | 100–600 | 200–355 | 1.430 | 30.0 |
| 16 | 1.04 | 3,000 | 80–600 | 100–300 | 1.426 | 33.2 |
| 17 | 1.07 | 3,000 | 75–400 | 75–125 | 1.380 | 32.2 |

The physical properties of the densified particles obtained in these two examples follow:

| | Overall Particle Size Range, microns | Majority Particle Size Range, microns | Absolute Density Dry, gms./cc. | Bulk Density Dry, lbs./cu. ft. |
|---|---|---|---|---|
| Example 5 | 100–1,500 | 100–300 | | |
| Example 6 | 100–500 | 100–250 | 1.426 | 33.2 |

The densified nitrocellulose particles of this invention can be produced from any fibrous nitrocellulose, obtained by nitrating natural or artificial cellulose fibers, such as cotton, purified cotton linters, purified wood pulp, regenerated cellulose fibers, and the like, in such forms as picked linters, shredded wood pulp, fluffed bulk linters, finely cut or ground fibers, fiber aggregate particles, and the like. However, it is important that the fibrous nitrocellulose be substantially free of fiber aggregates for use in this invention, for such aggregates interfere with proper comminution and lead to formation of undesirably large particles. Accordingly, it is both desirable and preferable to initially subject the fibrous nitrocellulose to a conventional jordaning, or similar fiber-beating treatment, to break up fiber aggregates and generally shorten the fibers prior to use in this invention. As pointed out hereinbefore, this is accomplished by slurrying water-wet nitrocellulose fibers in water to the consistency of a conventional pulping slurry and beating in a Jordan engine, or similar fiber-beating device.

Although smokeless-type nitrocellulose having a nitrogen content of about 13.4% or more by weight is the type of nitrocellulose customarily employed for the manufacture of smokeless powder, this invention is not limited to this type of nitrocellulose. On the contrary, substantially all commercial types and grades of fibrous nitrocellulose are suitable for the purposes of this invention, having nitrogen contents from about 10.9% to about 13.5% nitrogen by weight, and of any viscosity characteristic from the very low viscosity 10 centipoise type to exceedingly high viscosity types as exemplified by dynamite grade nitrocellulose.

The amount of nitrocellulose fibers which is employed in practicing this invention is governed by the ability to agitate the slurry effectively to form a uniformly smooth, readily stirrable slurry substantially free of fiber aggregates. Generally, slurries containing from about 11.9% to about 18.5% by weight of nitrocellulose, dry weight, have been employed, the optimum amount being about 16% by weight of nitrocellulose, dry weight. Slurries containing more than about 18.5% of nitrocellulose are usually of too high a consistency to be effectively agitated by the mild shearing agitation contemplated by this invention. Although slurries containing less than about 11.9% nitrocellulose can be employed, it is not considered economical to employ such slurries.

As noted hereinbefore, the volatile organic liquid mixture which is employed as the medium for the comminution, shaping, and densification of the nitrocellulose is a mixture of hydrocarbon diluent and nitrocellulose solvent. It is important and necessary for the hydrocarbon diluent and nitrocellulose solvent to be proportioned in the mixture so that the mixture is only a swelling and softening agent for nitrocellulose, incapable of dissolving the fibers. It will be apparent, of course, that suitable proportions of hydrocarbon diluent and nitrocellulose solvent to accomplish this objective will vary depending principally on the particular hydrocarbon diluent and nitrocellulose solvent selected, and to a minor extent on the nitrogen content and viscosity characteristic of the nitrocellulose to be comminuted and densified. However, with any particular selection of hydrocarbon diluent and nitrocellulose solvent, it is a simple matter to carry out a preliminary trial by slurrying the nitrocellulose in the selected hydrocarbon diluent and then progressively adding the selected nitrocellulose solvent with agitation until the point is reached where the mixture begins to swell the fibers. It is then only necessary in practicing this invention to make minor increases or decreases in the ratio of nitrocellulose solvent to hydrocarbon diluent to obtain the desired shapes, density, bulk density, range of particle sizes, etc. When employing mixtures containing heptane and acetone as the medium for comminution, shaping and densification of smokeless-type nitrocellulose of about 13.4% nitrogen, the ratio of acetone to heptane by weight can range from about 0.8 to about 1.4, and the ratio of acetone to nitrocellulose by weight can range from about 2 to about 3.5, optimum ratios being about one part acetone to one part heptane by weight and 2.4 parts acetone to one part nitrocellulose by weight.

Any volatile hydrocarbon which is liquid at ordinary temperatures and atmospheric pressure may be employed for the purposes of this invention, including aliphatic, cycloaliphatic, aromatic, arylaliphatic and aliphaticaryl hydrocarbons, and mixtures of any of these. Some typical hydrocarbons include, by way of example, hexane, heptane, octane, isooctane, nonane, and the like, various proprietary petroleum distillate cuts such as textile spirits, mineral spirits, lactol spirits, V.M.&P. naphtha, gasoline, kerosene, and the like, cyclopentane, cyclohexane, methylcyclohexane, benzene, toluene, xylene, ethyl benzene, styrene, α-methylstyrene, various proprietary aromatic hydrocarbon distillate cuts, mixtures of aliphatic and aromatic hydrocarbons, and the like. Aliphatic hydrocarbons which boil in the range of heptane or lactol spirits are preferred, and heptane is especially preferred.

Nitrocellulose solvents suitable for the purposes of this invention are the lower molecular weight ketones, esters, glycol ether-alcohols and glycol ether-esters which are soluble in water to the extent of at least about 2.5% by weight. Some typical nitrocellulose solvents which are suitable for practice of this invention include, for example, methyl formate, ethyl formate, methyl acetate, ethyl acetate, isopropyl acetate, methyl propionate, acetone, methyl ethyl ketone, diethyl ketone, ethylene glycol monomethyl ether, ethylene glycol monoethyl ether, methoxyethyl acetate, and the like. Preferably, the nitrocellulose solvent component of the organic liquid mixture of this invention should have a boiling point below the boiling point of the hydrocarbon diluent component, or should form a minimum boiling azeotropic mixture with the hydrocarbon diluent component and/or with water. Acetone is especially preferred for densification of smokeless-type nitrocellulose in accordance with this invention.

What I claim and desire to protect by Letters Patent is:
1. A process for preparing a small particle densified nitrocellulose product which comprises
   (a) dispersing water-moist nitrocellulose fibers in a volatile organic liquid mixture of nitrocellulose solvent and hydrocarbon diluent with mild shearing agitation to form a slurry substantially free of fiber aggregates;
   (b) said organic liquid mixture being only a softening and swelling agent for nitrocellulose incapable of dissolving said nitrocellulose fibers;
   (c) continuing the mild shearing agitation until substantially all of the nitrocellulose fibers are uniformly softened, swollen, and comminuted into fragments substantially within the size range from about 100 microns to about 500 microns;
   (d) diluting the slurry, while continuing the mild shearing agitation, with sufficient liquid non-solvent for nitrocellulose to form a layer of tough, densified nitrocellulose, substantially free of stickiness, enveloping each softened and swollen nitrocellulose fiber fragment to inhibit agglomeration of said fragments, and continuing said agitation until the fiber fragments have substantially all become shaped into smooth-surfaced, rounded particles of substantially ellipsoidal and spheroidal shapes;
   (e) said liquid nonsolvent for nitrocellulose being selected from the group consisting of water and hydrocarbon diluent which is the same as the hydrocarbon diluent component of said volatile organic liquid mixture;
   (f) and thereafter diluting the slurry with a large excess of said liquid nonsolvent for nitrocellulose and subjecting the thus diluted slurry to distillation with agitation to remove substantially all nitrocellulose solvent and hydrocarbon diluent when said liquid nonsolvent for nitrocellulose is water, and to remove substantially all nitrocellulose solvent and water when said liquid nonsolvent for nitrocellulose is hydrocarbon diluent to complete the hardening and densification of the particle.

2. A process in accordance with claim 1 in which said liquid nonsolvent for nitrocellulose is water.

3. A process in accordance with claim 1 in which said liquid nonsolvent for nitrocellulose is a hydrocarbon diluent.

4. A process in accordance with claim 1 in which the hydrocarbon diluent component of said volatile organic liquid mixture is heptane and the nitrocellulose solvent component is acetone.

5. A process in accordance with claim 4 in which the nitrocellulose is a smokeless powder type, the initial ratio of acetone to heptane in said volatile organic liquid mixture is between about 0.8 and about 1.4, by weight, and the ratio of acetone to nitrocellulose is between about one and about 2.4 by weight.

References Cited

UNITED STATES PATENTS

| | | | |
|---|---|---|---|
| 2,715,574 | 8/1955 | Cox | 264—3 |
| 2,885,736 | 5/1959 | O'Neill | 264—3 |
| 2,946,673 | 8/1960 | Grassie | 264—3 |
| 2,948,601 | 8/1960 | Grassie | 264—3 |
| 3,236,702 | 2/1966 | Sapiego | 264—3 |
| 3,284,253 | 11/1966 | Enders et al. | 264—3 |

L. DEWAYNE RUTLEDGE, *Primary Examiner.*